TANK CIRCUIT FOR RADIO-FREQUENCY TRANSMITTERS AND THE LIKE ADAPTED FOR ETCHED OR PRINTED CIRCUITRY TECHNIQUE

Filed Jan. 9, 1957

INVENTOR
HERBERT K. JANSSEN
RICHARD S. WOLF

BY K. G. Doub
ATTORNEY 2,933,704

TANK CIRCUIT FOR RADIO-FREQUENCY TRANSMITTERS AND THE LIKE ADAPTED FOR ETCHED OR PRINTED CIRCUITRY TECHNIQUE

Herbert K. Janssen, Essex, and Richard S. Wolf, Sparrows Point, Md., assignors to Bendix Aviation Corporation, Baltimore, Md., a corporation of Delaware Application January 9, 1957, Serial No. 633,228

5 Claims. (Cl. 333—82)

In the manufacture of radio transmitters, various types of tuning and/or trimmer capacitors have been utilized. When a circuit is printed on a suitable base, such as a phenolic board or slab, known types of such capacitors now commercially available are in many instances unsuitable, since the cost thereof may be too great and/or they may not be adaptable to automatic insertion and assembly techniques. This is particularly true in telemetering devices commonly known as radiosondes, the use of which has increased to a point where mass production at a minimum cost of components has become imperative. In the production of radiosondes, specifications usually require a transmitting frequency within a certain range. When the instrument is calibrated, the frequency of the transmitter is adjusted to some specified value, say 403 mc., and in the field prior to flight the instrument may again be adjusted to compensate for drift, or to set the frequency at, say, 406 mc. to avoid interference by other transmitters in that particular region. Printed circuitry techniques and the use of dip-soldering and automatic insertion and assembling machines have materially reduced the cost of the radiosonde, but its widespread use has constantly necessitated every opportunity to further reduce the cost of the components such as condensers, resistors, coils and the like and at the same time better adapt the unit for mass production. Trimmer capacitors of the conventional type are well suited for adjusting the frequency in transmitters, but in the case of the radiosonde, citing one example, the cost has become prohibitive. Furthermore, such types of trimmers ofttimes present a problem where the circuitry is printed on a dielectric base and certain of the components are assembled or installed by machinery.

An object of the present invention, therefore, is to provide a tank circuit for an oscillator such as a radio frequency transmitter having means for adjusting or setting the oscillation frequency which is simple in construction, easy to install, and particularly adapts itself for printed circuitry techniques.

Another object is to improve and at the same time simplify the tank circuit of a radio frequency transmitter for telemetering and like radio devices utilizing printed circuitry technique.

The foregoing and other objects and advantages will become apparent in view of the following description taken in conjunction with the drawing, wherein.

Figures 1, 2, 3, 4, 5:
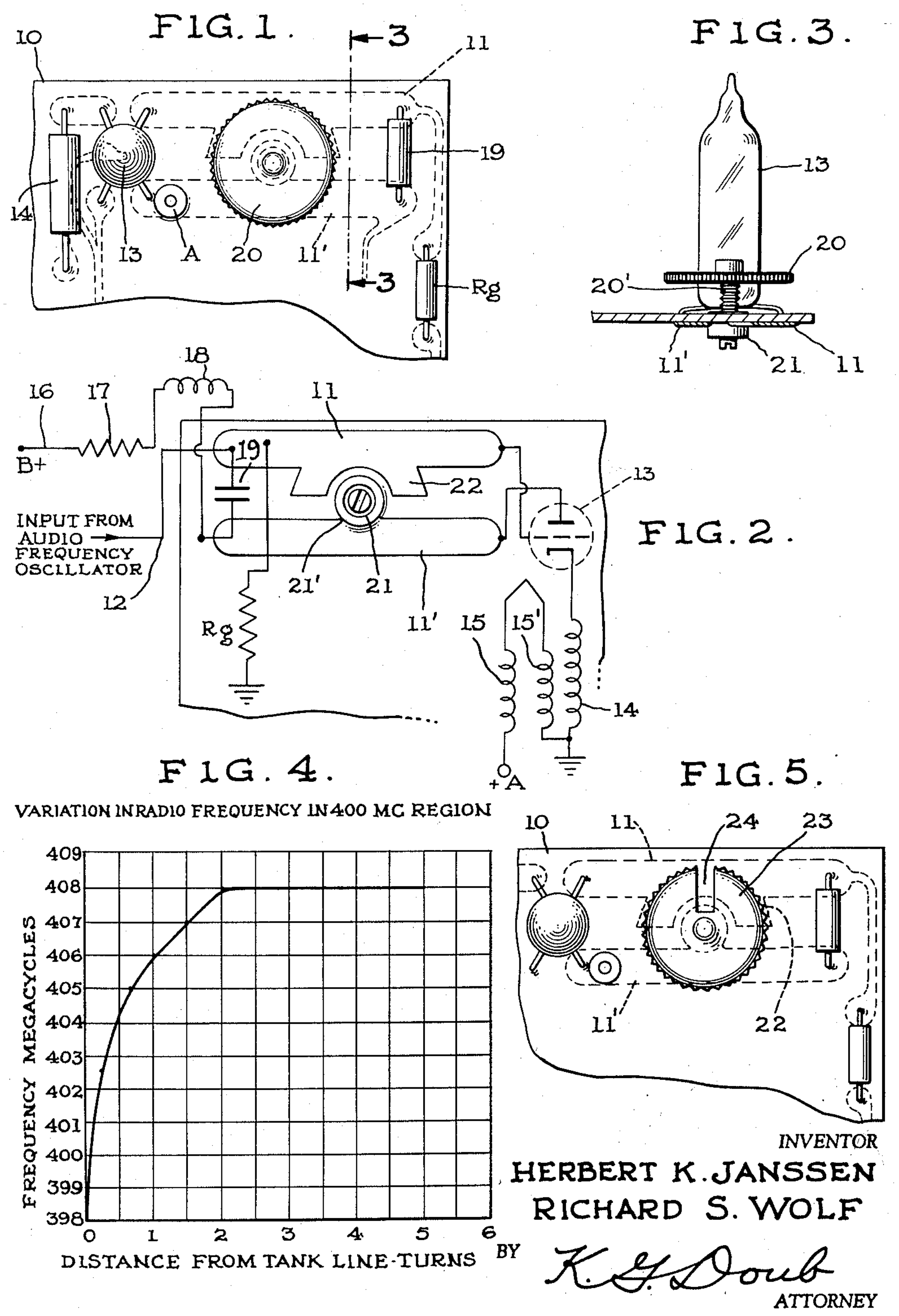
Figure 1 is a fragmentary top plan view of the radio frequency transmitter section of a radiosonde circuit incorporating the invention.
Figure 2 is a bottom plan view of Figure 1, with part of the printed circuitry shown in diagram.
Figure 3 is a section taken substantially on the line 3—3, Figure 1.
Figure 4 is a curve chart, showing the results of adjustment in the 400 mc. region.
Figure 5 is a view similar to Figure 1 showing a modified form of tank circuit and coacting frequency-adjusting device.

Referring to the drawing in detail, and first to Figures 1, 2 and 3, the corner portion of a circuit-supporting base or board is shown at 10, said base having mounted thereon the radio frequency oscillator section of a conventional type of telemetering device, such as the radiosonde. For example, the radio frequency oscillator may be modulated as a function of the relaxation frequency of a second or audio oscillator, whose relaxation rate in turn is determined as a function of the condition or conditions being measured. In the present instance, it can be assumed that the transmitted wave is a radio frequency carrier having a frequency of 403 mc. per second, pulse modulated at an audio frequency in the range of, say, from zero to 200 cycles per second.

In the example shown, the radio frequency oscillator circuitry consists of a quater-wave tuned resonant transmission line or tank circuit made up of a pair of spaced parallel conductors 11 and 11′, which are in the form of strips of conductive material such as copper desposited as by the etching process on the one surface of the base 10 and which for the purpose of description may be considered as its under surface. The conductor indicated at 12 represents the input from the audio-frequency oscillator. The electron discharge device or tube, indicated at 13, has its output or plate circuit connected to the line 11 and its input or grid circuit to the line 11′. The cathode of the tube 13 is connected to ground through a choke coil 14, which provides the proper phase of feedback voltage existing between the cathode and grid; and the filament circuit also has therein a pair of choke coils 15 and 15′, to isolate the major portion of the high frequency currents from the filament supply as well as from the filament circuit of the audio oscillator. These choke coils are shown diagrammatically, but in practice they are printed on the board 10. The plate supply line 16 has a resistor 17 and an inductor 18 in series therein, to filter out radio frequency oscillations which might otherwise be fed to the tank circuit from the audio oscillator. The capacitor indicated at 19 shunts a portion of the tuned circuit and, acting as a radio frequency short circuit, provides the primary frequency setting for the tank circuit. The device indicated at A is an internally-threaded socket for detachably receiving an antenna, not shown.

The circuit above-described constitutes an ultra audion, ultra high frequency oscillator capable of producing a carrier wave having a range of frequencies of, for example, from 400 to 406 mc. The triode 13 operates in a state of continuous oscillation at a normal frequency of, say, 403 mc. per second. This frequency is initially established by the length and/or breadth of the copper conductors 11 and 11′, the interelectrode capacities of the tube 13, and stray wiring capacities and inductances, including the capacitor 19, but it ofttimes becomes necessary to reset the frequency, as where it is desired to compenate for drift, or to avoid interference with other transmitters operating in the same region. As heretofore noted, the use of the conventional trimmer capacitor results in problems of excessive cost as well as interference with printing and assembly techniques. The problem was effectively solved by utilizing a trimmer capacitor in the form of a disc wheel 20, having a stem or shank 20′, adjustably secured in a holder or socket 21 of conductive material, said holder in practice consisting of an internally-threaded eye or grommet fixed in the phenolic base 10. The holder 21 is electrically connected to the conductor 11′, as indicated at 21′ in Fig. 2 and is spaced from the conductor 11, the latter being provided with an enlarged area 22 immediately beneath the disc 20 for a purpose to be described. The disc-shaped screw head which forms the trimmer capacitor 20 may be made of any suitable conductive material having the necessary capacity; in practice aluminum has proved satisfactory. Likewise, the internally-threaded eye or grommet 21 may be made of brass or like conductive material having the requisite strength. Instead of a threaded socket, a friction-type socket may be utilized; but to ensure against slippage or any slight displacement, a threaded, relatively snug socket is to be preferred.

The curve chart of Figure 4 illustrates the action of the trimmer capacitor disc 20. This chart plots frequency in megacycles against the distance from the tank line in turns of the said disc. Obviously, the values per turn apply only to a given pitch of screw thread. In the example illustrated, the screw stem has an outside diameter of .090" and there are forty threads per inch. It will be noted that the curve starts at a frequency of about 398 mc., at which frequency the cap or disc is substantially flat against the upper surface of the phenolic base 10. As the screw cap 20 is rotated away from the board or base 10 up until the second full or complete turn, the frequency varies from 398 to 408 mc.; and from the second turn on the frequency is unaffected. Thus, assuming the adjustment is between a frequency of 400 to 406 mc., then the screw cap or disc 20 would be set at some point between a partial turn and one complete turn. Obviously, the degree of induced capacitive reactance resulting from adjustment of the disc 20 will be determined by various factors, such as the area of the disc, the material of which it is made, the frequency of the transmitter, and the effective area of the tank line or conductors 11 and 11'.

It will be apparent that the disc-shaped trimmer capacitor 20 varies both the capacitive and inductive reactance of the tank circuit as it is rotated or adjusted toward and from the spaced parallel conductors 11 and 11' which make up the transmission line, the inductance tending to cancel the capacitance. Obviously, the closer the disc 20 is adjusted to the tank line the greater will be the build-up of external capacitance and the lower will be the frequency of the line, the reverse action resulting from an outward adjustment of the disc. The inductive effect is that of a closed loop placed near the tank circuit, and here again the inductance is at a maximum when the disc is in its furthermost inwardly-adjusted position where it lies substantially flat against the adjacent surface of the phenolic board 10. If the stem of the trimmer disc 20 were electrically disconnected or spaced from both of the conductors 11 and 11', the capacitive effect on the tank line would be that of two capacitors connected in series across the conductors 11 and 11'. This materially cuts down the range of adjustment. However, by electrically connecting the disc capacitor 20 to one of the conductors, as in Fig. 2 where it is electrically connected to the conductor 11', one of the series capacitors is eliminated and the capacity then becomes twice that which would exist when the said capacitor is electrically unconnected or spaced from both of the lines or conductors 11 and 11'. This may be proved as follows: Let C1 and C2 represent the capacitance between the disc 20 and each of the conductors 11 and 11', assuming the stem 20 is electrically unconnected from said conductors. Since C1 and C2 are then substantially equal, the combination would be equal to $$\frac{C1\times C2}{C1+C2}$$

If we let C1 and C2 both equal some value C, then the combination would equal $$\frac{C\times C}{2C}=\frac{C^2}{2C}=\frac{C}{2}$$

hence the capacity of the combination with the stem electrically unconnected would be one-half the value of either capacitor. By electrically connecting the stem to one of the conductors or tank lines as best shown in Fig. 2, the capacity equals C, or twice that which exists for any given setting of the disc 20 when the disc is electrically unconnected from one of said lines. This materially offsets the inductive reactance $X_L$ resulting from adjustment of the trimmer capacitor or disc 20.

By increasing the area of the conductor 11 immediately beneath the disc 20, the capacity effect is correspondingly increased, and this affords a still greater range of frequency adjustment.

Figure 5 illustrates how the inductive effect of the trimmer wheel or disc may be materially reduced by cutting a radial slot in the said disc. In this figure the trimmer wheel is indicated at 23 and the radial slot at 24. Other than this, the circuitry of Figure 5 is similar to that shown in the preceding figures. When the disc is solid, it represents a closed loop, and by providing a slot in the wheel as shown in Figure 5, the closed-loop is eliminated and the inductive reactance greatly decreased. In this manner the range of adjustment may be still further increased, although the cost of making the trimmer may be more than the solid disc type, or the particular method of manufacture available may not be such as to permit convenient formation of the slot 24.

Other modifications in the circuitry and components will be apparent to those skilled in the art once the basic concept of the invention has become known.

In fabricating the circuit, the conductors 11 and 11' may be printed on the base 10, the eye or grommet 22 inserted automatically along with other components and all connections conveniently dip-soldered. The trimmer capacitor may be made as a separate unit and easily and quickly installed whenever desired; it does not interfere in any manner whatsoever with basic fabrication of the circuitry yet is always ready for each installation with little or no chance of changing its calculated performance.

The term "tank circuit" as used herein, is meant to include any oscillatory circuit, such as those found in transmission lines, resonant circuits and the like; and the word "printed," as applied to circuitry, means any circuit which is printed, etched or otherwise deposited on a suitable base which is usually of dielectric material.

What is claimed is:

1. In an electrical circuit, a base having printed on one surface thereof a tank circuit including a pair of spaced elongated substantially parallel conductors, a trimmer capacitor comprising a flat substantially disc-shaped head of conductive material located on the opposite surface of said base in a plane, substantially parallel to the plane of said conductors and having a stem threaded through the base and electrically connected to one of the conductors, said head being radially slotted from the stem outwardly to break the inductive loop which would otherwise exist in said head.

2. In an electrical circuit, a base having printed on one surface thereof a tank circuit including a pair of spaced flat, elongated, substantially parallel conductors, a trimmer capacitor comprising a flat substantially disc-shaped head of conductive material, an internally threaded grommet fixed in said base centrally of said conductors and electrically connected to one of the latter, said trimmer capacitor having a stem adjustably threaded through said grommet, the other of said conductors being formed with an enlarged area in the region encompassed by said head and the latter being formed with a slot extending radially substantially from its center and continuing through the peripheral edge thereof to break the inductive loop which would otherwise be present in said head.

3. In an electrical circuit, a base of dielectric material having printed on one surface thereof a tank circuit including a pair of spaced substantially parallel conductors, a trimmer capacitor comprising a member having a substantially disc-shaped head of conductive material located adjacent said conductors in a plane substantially parallel thereto and a stem also of conductive material projected through a socket in said base in electrical contact with one only of said conductors, said stem being mounted for free adjustment in its socket toward and from said base to permit the disc-shaped head to be selectively spaced from said conductors and thus compensate within a limited range for any variation from the initially established oscillation frequency of said circuit.

4. The electrical circuit as claimed in claim 3 wherein the conductor which is unconnected to the stem of the trimmer capacitor has an enlarged surface area within the region encompassed by said head.

5. In an electrical circuit, a flat base of dielectric material having printed on one surface thereof a tank circuit designed to oscillate at a given frequency including a pair of spaced substantially parallel conductors, a trimmer capacitor comprising a threaded stem and a flat substantially disc-shaped head of conductive material, said head being located on the opposite surface of said base in a plane substantially parallel to the plane of the conductors, an internally threaded grommet secured in said base through which said stem is threaded to enable the head to be selectively spaced from said conductors and thus compensate within a limited range for any variation from the initially established frequency of said circuit, said grommet being also of conductive material and in contact with one only of said conductors to electrically connect the said head to said one conductor, the other conductor having an enlarged surface area within the region encompassed by said head.

References Cited in the file of this patent

UNITED STATES PATENTS

| | | |
|---|---|---|
| 2,159,510 | Alford | Oct. 21, 1941 |
| 2,358,462 | Mahren | Sept. 19, 1944 |
| 2,447,592 | Crawley | Aug. 24, 1948 |
| 2,757,344 | Kostritza et al. | July 31, 1956 |

UNITED STATES PATENT OFFICE

CERTIFICATE OF CORRECTION

April 19, 1960

Patent No. 2,933,704

Herbert K. Janssen et al.

It is hereby certified that error appears in the printed specification of the above numbered patent requiring correction and that the said Letters Patent should read as corrected below.

Column 6, line 14, list of References Cited, under UNITED STATES PATENTS, for the patent number "2,159,510" read -- 2,259,510 --; line 16, for the patent number "2,447,592" read -- 2,447,492 --.

Signed and sealed this 20th day of September 1960.

(SEAL)

Attest:

KARL H. AXLINE
Attesting Officer

ROBERT C. WATSON
Commissioner of Patents